United States Patent
Bucklew et al.

(10) Patent No.: US 11,992,895 B2
(45) Date of Patent: May 28, 2024

(54) LASER CUTTING METAL FOIL WITH A POLYMER BACKING LAYER

(71) Applicant: PRECO, LLC, Somerset, WI (US)

(72) Inventors: James Bucklew, Somerset, WI (US); David Plourde, New Richmond, WI (US); Kevin Noeldner, Somerset, WI (US); Kevin Mitchell, New Richmond, WI (US)

(73) Assignee: PRECO, LLC, Somerset, WI (US)

( * ) Notice: Subject to any disclaimer, the term of this patent is extended or adjusted under 35 U.S.C. 154(b) by 478 days.

(21) Appl. No.: 16/781,545

(22) Filed: Feb. 4, 2020

(65) Prior Publication Data

US 2020/0246910 A1    Aug. 6, 2020

Related U.S. Application Data

(60) Provisional application No. 62/801,510, filed on Feb. 5, 2019.

(51) Int. Cl.
*B23K 26/00* (2014.01)
*B23K 26/046* (2014.01)
*B32B 15/08* (2006.01)

(52) U.S. Cl.
CPC ........ *B23K 26/009* (2013.01); *B23K 26/0006* (2013.01); *B23K 26/046* (2013.01); *B32B 15/08* (2013.01)

(58) Field of Classification Search
CPC .......................... B23K 26/009; B23K 26/0006; B23K 26/046; B23K 26/40; B23K 26/38; B23K 26/384; B23K 26/0821; B23K 26/0622; B23K 26/382; B23K 26/0665; B23K 26/0734; B23K 26/0846; B23K 26/16; B23K 26/364; B23K 26/702; B23K 26/0876; B23K 26/50; B23K 26/1476; B23K 26/36; B23K 26/14; B23K 26/142; B23K 26/0624; B23K 26/08;

(Continued)

(56) References Cited

U.S. PATENT DOCUMENTS

| 5,800,724 A | 9/1998 | Habeger et al. | |
| 2013/0334739 A1* | 12/2013 | Miller | B23K 26/702 |
| | | | 425/142 |
| 2015/0306706 A1* | 10/2015 | Kancharla | B23K 26/073 |
| | | | 219/121.72 |

FOREIGN PATENT DOCUMENTS

| JP | H04116887 A | * | 4/1992 | ........... B23K 26/402 |
| JP | H04116887 A | * | 12/1998 | ........... B23K 26/402 |

(Continued)

OTHER PUBLICATIONS

European Search Report issued in related European application serial No. 20155501.8, dated Jul. 17, 2020.

*Primary Examiner* — Dana Ross
*Assistant Examiner* — Adam M Eckardt
(74) *Attorney, Agent, or Firm* — Westman, Champlin & Koehler, P.A.; Z. Peter Sawicki; Amanda M. Prose

(57) ABSTRACT

Laser cutting a metal foil by providing a polymer film as a carrier layer for the metal foil where the metal foil is ablated by the laser beam wavelength selected for laser cutting and wherein the polymer film is a polymer film that is transparent to the laser beam wavelength selected for laser cutting such that laser cutting produces metal foil cut parts in a substrate while the polymer backing remains intact for supporting the cut parts for subsequent separation of the cut parts from substrate.

14 Claims, 2 Drawing Sheets

(58) Field of Classification Search
CPC .. B23K 26/073; B23K 26/53; B23K 26/0676; B23K 26/0613; B23K 26/0738; B23K 26/18; B23K 26/57; B23K 26/22; B23K 26/244; B23K 26/0604; B23K 26/082; B23K 26/0648; B23K 26/55; B23K 26/359; B23K 26/0608; B23K 26/067; B23K 26/0661; B23K 26/361; B23K 26/147; B23K 26/066; B23K 26/123; B23K 26/355; B23K 26/064; B23K 26/06; B23K 2103/172; B23K 26/00; B32B 15/08; B32B 3/266; B32B 27/32; B32B 27/08; B32B 27/306; B32B 3/20; B32B 37/18; B32B 41/00; B32B 27/283; B32B 15/12; B32B 7/12; B32B 29/005; B32B 27/10; B32B 27/36; B32B 15/043; B32B 15/18; B32B 15/085; B32B 15/09; B32B 15/20; B32B 3/22; B32B 38/10; B32B 7/14; B32B 3/18; B32B 15/04; B32B 43/006; B32B 27/34; B32B 27/40; B32B 7/06; B32B 27/20; B32B 27/18; B32B 15/011; B32B 17/00; B32B 17/1099; H04N 5/23203; H04N 5/247; B01L 3/502707; G06T 7/0004; B65B 61/02; B31F 1/07; B29C 59/007; B05B 13/00; B65D 81/3446; G08B 13/2437; G08B 13/244; G08B 13/2445; H05K 3/027; H05K 5/03; H05K 3/0035; B31B 70/16; B31D 1/0018; H01L 31/0516; H01L 21/67092; H01L 21/6835; H01L 21/78; H01L 21/3043; H01L 31/0463; H01L 31/18; C03B 33/074; C03B 33/0222; C03B 33/091; C03B 33/082; C03B 33/00; C03B 33/078; C03B 33/04; C03B 33/093; G02B 3/0087; G02B 26/10; C08K 3/22; C08K 3/34; C09J 7/38; C09J 7/22; B23P 17/00; C03C 15/00; C03C 17/32; B28D 1/221; B28D 5/022; B28D 5/0011; B28D 5/04; B28D 5/029; B26F 3/002; B26F 3/06; C23C 14/048; C23C 14/12; B41M 5/38214; B44C 1/228; B44C 3/005; B44C 1/1729; B26D 9/00; B26B 19/384; C25D 1/08; C23F 1/02

See application file for complete search history.

(56) References Cited

FOREIGN PATENT DOCUMENTS

| WO | 2013/115851 A1 | 8/2013 | |
|---|---|---|---|
| WO | WO-2013115851 A1 * | 8/2013 | ............ H05K 3/027 |
| WO | 2015/168276 A1 | 11/2015 | |
| WO | 2018/065839 A1 | 4/2018 | |

* cited by examiner

LASER CUTTING METAL FOIL WITH A POLYMER BACKING LAYER

CROSS-REFERENCE TO RELATED APPLICATIONS

This application is based on and claims the benefit of U.S. provisional application Ser. No. 62/801,510, filed Feb. 5, 2019, the content of which is hereby incorporated in its entirety.

BACKGROUND

The present invention relates to laser cutting one or more parts from a metal foil. More specifically, the present invention relates to providing a substrate comprising a polymer backing layer to a metal foil layer for laser cutting the metal foil layer.

Laser systems are often employed to laser process a variety of substrates by cutting, perforating, etching or scoring the substrate. The laser system may include one or more airflows provided to lift a plume of debris generated at a cut site and to carry the plume of debris to an exhaust. The air flow introduced to the laser system during laser processing a substrate is directed at the laser cut site to prevent debris from the ablation of the substrate from depositing on the substrate being processed. Further, when cutting metal foil, the air stream may also allow the cut metal foil proximate the cut site to cool and re-solidify forming a boundary to the cut part. However, as metal foil layers are thin layers of material, when laser cutting parts from the metal foil substrate, the impinging air blows the cut parts into undesirable locations in the laser processing system. Further, when multiple passes of a laser beam are required to cut a metal foil substrate along a selected path, the impinging air moves the substrate in-between passes of the laser beam. The laser beam then will not be able to hit the exact same location on a second pass, if required. The inability to direct the laser beam spot to the same target location can create very fine strands of metal foil hanging from the cut part and thus limit the thickness of metal foil substrate that can be laser cut with a multi-pass process.

Impinging air is necessary to prevent metal vapors generated during laser processing from settling on the cut part, re-solidifying and/or re-bridging of the cut. However, the impinging airflow causes the processed material to move with respect to the web after it is cut. More specifically, the cut portions of the metal foil layer are moved (e.g., blown) by the impinging air flow. When the material moves between cuts, it is not practical to use a multi-pass method for cutting the metal foil. Additionally, once the material moves, it is harder to separate the waste or scrap substrate from the cut part effectively.

SUMMARY

An aspect of the present disclosure relates to a method of laser cutting a metal foil layer. The method comprises providing a carrier layer for the metal foil layer; generating a laser beam having a selected wavelength; and directing the laser beam toward a surface of the metal foil layer to cut the metal foil layer. The metal foil layer is vaporized by the laser beam at the selected wavelength and wherein the carrier layer is transparent to the laser beam at the selected wavelength such that the carrier layer remains substantially intact while the metal foil is laser cut into a plurality of parts.

The carrier layer is a polymer film that is transparent to the selected wavelength.

The carrier layer is laminated to the metal foil layer using an adhesive layer.

The laser beam is then directed to removal areas cut from the substrate to cause the metal foil to curl proximate one or more cut lines and lift off of the carrier layer to aid in separation of the carrier layer from the metal foil layer.

The substrate is retained in place during laser processing by a restraining mechanism comprising generating a vacuum below the substrate.

The laser beam is defocused when directed to removal areas and a scanning speed of the laser beam is also decreased for directing the laser beam to removal areas.

The defocused laser beam is directed along a sinusoidal pattern on the removal areas to curl or bend the metal foil layer.

Another aspect of the present disclosure relates to a substrate construction for laser cutting a metal foil. The substrate construction has a metal foil layer and a carrier layer supporting the metal foil layer. The metal foil layer comprises a metal that is vaporized by laser energy provided at a selected wavelength and wherein the carrier layer is transparent to the laser energy provided at the selected wavelength.

The carrier layer is a polymer film.

The substrate construction has an adhesive layer between the carrier layer and the metal foil layer.

The polymer film remains intact when the metal foil layer is cut by laser energy from a laser beam having a wavelength in the range of 1020 nm to 1090 nm.

Yet another aspect of the present disclosure relates to a method of laser processing a multi-layer substrate by vaporizing one or more locations on a top layer of the substrate with a laser beam at a selected wavelength to a cut a part from the top layer and subsequently directing the laser beam to one or more separation locations at or near one or more of the vaporized locations to cause the top layer to curl at or near at least one or more of the separation locations.

The top layer comprises a metal foil.

The multi-layer substrate further comprises a bottom layer that is a carrier layer.

The carrier layer comprises a polymer.

The laser beam stresses the top layer at or near separation locations but does not cut the top layer at or near the separation locations such that the laser beam then causes the top layer to separate from a carrier layer.

The multi-layer substrate further comprises an adhesive layer between the top layer and the carrier layer.

Subsequently directing the laser beam to one or more separation locations further comprises defocusing the laser beam.

DETAILED DESCRIPTION

Figure 1:
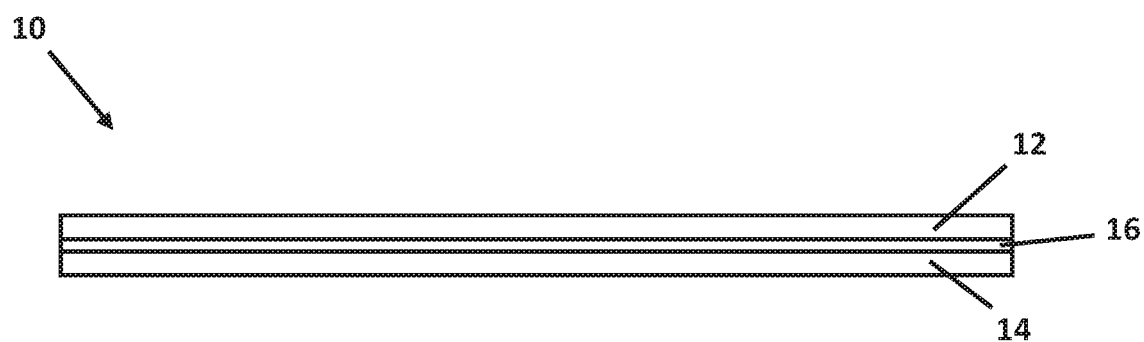
FIG. 1 illustrates a substrate construction according to embodiments described herein.

A method of laser processing a metal material having a polymer backing, such as a metal foil or a multi-layer material having at least one metal foil layer therein, to cut one or more parts from the metal foil is described herein.

While the disclosure that follows is directed to a metal foil material having a polymer backing or carrier layer as described, the methods and systems described herein can also be applied to a metal layer or metal foil layer with a backing and/or or multi-layer material having one or more metal or metal foil layers and having one more backing, carrier, cover or support layers. Moreover, the backing and/or additional support layers may be a polymer film or constructed of a like material that does not absorb or otherwise does not sufficiently absorb the laser wavelength at which the metal layer is ablated. The backing or carrier layer described herein may be adhered to the metal foil layer using an adhesive.

In one embodiment, a laser processing system directs a laser beam toward a surface of the metal foil to cut one or more parts from the metal foil. Laser processing, for example, includes cutting and/or perforating the material. The material as referred to hereinafter may be a metal foil layer having a polymer carrier layer and/or other multi-layer substrates having at least one metal foil layer therein as described throughout this disclosure. The laser beam energy and laser processing system optics are selected to ablate the metal or metal foil layer in the material at a target area (e.g., an area on the surface of the material at or near the laser beam focal point) to a depth substantially equal to, less than, or greater than the thickness of the material depending on the ultimate use of the material. Thus, the laser beam may be used to form perforations, holes, or cuts to fully separate an area (cutting a part) from the material along a selected path.

What is meant by the "metal foil" as used throughout this disclosure is a thin layer of a metal. For example, the methods described herein can be used to laser cut nearly any metal or metal alloy (e.g. aluminum, stainless steel, nitinol, copper, gold, etc.) wherein the metal is provided as a foil layer. The foil layer is a thin layer of metal, for example the metal foil is a layer having a thickness in the range of about 1 micron to 300 micron. The methods described herein can also be used to cut metal foil layers having a thickness less than or greater than about 300 microns.

In further detail, a laser processing system referred to herein is a system for processing (e.g., cutting, etching, perforating etc.) a material through the use of laser beam technology. Lasers provide a very efficient method of cutting, scoring, perforating or otherwise preparing selected materials for various end uses over the old mechanical systems, which may include die systems or pin type roller perforators. Lasers cut, score, or perforate the material through the use of a collimated amplified beam of light that terminates in a focal point. It is at or near the focal point of the beam that processing typically occurs. Intense energy at the focal point processes the material in what can be described as essentially a vaporizing, burning or ablating process.

The laser energy is focused on a surface of the material to vaporize a target area in the material at or along a cut site. The laser processing system comprises a focusing lens for focusing the laser energy on the material surface. The cutting of the material is generally directly related to how well the material "reacts" to the wavelength of the laser beam. What is meant by "reacts" is the ability of the material to absorb light or heat at the selected wavelength. A material that reacts with the wavelength of the laser beam is ablated or vaporized by the laser beam whereas a material that reacts poorly with the laser beam is a material that is transparent to the laser beam and otherwise does not absorb light or heat at that selected wavelength or otherwise absorbs insufficient light or heat to result in vaporization by the laser beam at that wavelength.

An assembly for laser processing the material as described herein comprises a laser source in communication with optics for directing the beam or multiple beams to the material for processing. The material for processing may also be referred to herein after as a "substrate." The substrate may be provided and processed in sheets, or as a web of material. The substrate may be stationary during laser processing, while the laser beam moves to produce cuts in the substrate. Alternatively, the substrate may be a moving web such that the substrate moves through the laser assembly during laser processing. The web moves through the laser processing system in what is referred to as a web direction of travel. This allows a web of substrate to be processed continuously while passing below the laser beam concurrently during processing to produce a plurality of cuts or holes in the substrate. The substrate can have a varying thickness and may or may not include more than one backing or polymer layer to add strength and/or structure to the metal foil layer being laser processed.

A focal point(s) of the laser beam(s) also referred to as a laser spot is directed to a target area on the surface of the substrate using a process referred to as "scanning", which requires controlling and directing the laser beam(s) for precision cutting along a selected pattern. A controller sends commands to the laser processing assembly to direct the laser beam(s) as the substrate is positioned for processing (whether the substrate is stationary or moving) to cut the substrate according to the selected pattern.

The laser assembly may comprise, for example, an infrared (IR) laser, fiber laser, a CO laser, a $CO_2$ laser or other lasers and/or laser wavelengths (e.g., UV wavelength) for cutting the metal foil layer in the substrates described herein. In the embodiments described here, an infrared laser or fiber laser is used. The laser system and settings are selected based on the construction of the substrate being processed. For example, a laser wavelength is selected based on its ability to ablate the metal foil layer and the thickness of the metal layer. A carrier layer is adhered to the metal foil layer and the construction of the carrier layer is selected based on its ability to withstand ablation at that selected wavelength. When processing the metal foil layer within the substrate, the laser beam wavelength may be approximately 1 micron or more specifically may be 1.08 micron. For example, laser beams having a wavelength in the one (1) micron range, an infrared wavelength, commonly referred to as the 1 micron "family" of lasers can be used to process the metal layer as described and according to the methods herein. Lasers having a wavelength in the range of about 1020 nm to about 1090 nm may also be used. It is also contemplated that the methods described herein can be carried out with any laser wavelength in combination with laser power and energy density sufficient to cut metal, this may also include "green" and ultra-violet wavelengths The methods described herein utilize a laser beam to ablate or vaporize the metal layer of the substrate. The carrier layer is a polymer film that is not vaporized, even though the laser beam is directed at, to, or through the carrier layer. That is to say, the polymer film is provided as a backing layer to the metal foil layer and the substrate is processed with a laser beam at the selected wavelength such that the metal foil reacts well with the selected laser beam wavelength and the polymer film reacts poorly with that same selected laser beam wavelength.

The carrier layer(s) may be a polymer film that is comprised of a polymer that is transparent or substantially transparent to the laser wavelength used for ablating or vaporizing the metal foil layer(s) in the substrate. Thus, the carrier layer does not absorb the laser energy during laser cutting and the polymer film remains intact or substantially intact after laser cutting even though the carrier layer(s) is/are exposed to at least a portion of the laser beam energy directed to the metal foil layer when the metal foil layer is cut. The carrier layer supports the metal foil layer during laser cutting and more specifically retains one or more cut parts with the substrate to prevent the cut parts from moving due to air flow within the laser system. The cut parts are target areas of the metal foil layer that are cut away from the substrate according to a preselected pattern.

Further, an adhesive layer may be used between the metal foil layer and the polymer film to adhere the polymer backing to the metal foil layer. The laser beam wavelength may or may not ablate or vaporize the adhesive along with the metal foil layer.

In such an embodiment, prior to laser processing the substrate, the carrier layer is laminated or otherwise adhered to the metal foil layer. The carrier layer may be adhered to the metal foil layer with the adhesive layer. The adhesive may be a pressure sensitive adhesive or an adhesive providing weak adhesion between a surface of the polymer film and a surface of the metal foil. The metal foil is laser processed and one or more parts are cut in the metal foil layer. The cut parts and the excess metal foil layer (e.g., scrap) remain adhered to the carrier layer(s) during and at least immediately after laser cutting of the metal foil layer into parts. The metal foil layer and the cut parts can then be transferred to a take-up roll and removed from the laser processing system for separation of the cut parts from the scrap and for removal of the carrier layer.

In one or more embodiments, the metal foil layer is laser cut with a 1-micron wavelength laser beam. The carrier layer comprises a polymer film constructed of a polymer that resists significant vaporization at approximately a 1-micron wavelength and thus the carrier layer sustains little to no damage during laser cutting of the metal foil layer. The polymer film is a thin film that acts as a carrier, allowing the cut part of the metal layer to be separated from the polymer backing after laser processing, while the scrap material stays adhered to the carrier for easy separation. As the carrier layer is substantially un-cut, the carrier layer can be easily removed from the metal foil layer while concurrently releasing the cut parts from the backing layer and separating the cut parts from the scrap metal foil layer.

In one or more embodiments, the substrate, whether a sheet or a web, is indexed to a cutting area within a processing window of the laser processing system. The cutting area of the laser system comprises a substantially flat surface having a plurality of apertures for providing a vacuum at the cutting area and wherein the negative air flow through the apertures retains the substrate in place in a substantially flat position within the processing window such that the material does not move during laser processing.

As described above with respect to the methods described herein, the metal foil layer is cut using the laser beam. The laser energy from the laser beam is sufficient to ablate or vaporize the metal from the metal foil layer first while the metal foil layer is on top of the carrier film. Any remaining laser beam energy after cutting of the metal foil layer then passes through the polymer film carrier layer. The laser beam energy via the laser spot is directed to a top surface of the substrate and thus a top surface of the metal foil layer. The intact polymer film below the metal foil layer during laser cutting allows for an increase in air pressure between the metal foil layer and the intact polymer carrier layer where the increase in air pressure is at least in part generated by the vaporization of the metal in the metal foil above the polymer film. This increase in air pressure at or near the cut site(s) in the metal foil results in the "blowing-away" or ejection of the vaporized metal, also referred to generally as a "debris plume" which is generated at the cut site when the metal foil is vaporized. The metal foil vaporization generates debris that is ejected either downwardly or upwardly from the cut site (e.g., into the cut or away from the cut site).

When the plume is ejected upwardly, the debris plume falls back down onto the top surface of the substrate, unless a vacuum or additional air flow is introduced to sweep the plume away. In the embodiment described herein with the carrier layer remaining undamaged or otherwise minimally damaged but intact during laser processing, the carrier layer aids in forcing the upward ejection of the debris plume away from the cut site based on the air pressure generated at the cut site. This plume can then be carried away by air flow within the laser processing system as for example, an impinging air flow may carry away the vaporized material during laser processing.

In target areas where the metal foil and the carrier layer will be separated or partially separated, after the metal foil part is laser cut, the laser beam is directed at the metal foil area to be removed. The laser beam does not cut the material that is to be removed, but instead the laser beam is set to process the material to be removed at a time and/or laser energy sufficient to interact with material to be removed and thus stress the material to be removed causing the material to be removed to curl and partially lift off of the carrier layer thus partially separating the two layers.

After cutting the part from the metal foil layer, in one embodiment, the laser beam is then defocused to decrease an intensity of the laser energy, and a scan speed is reduced. The laser bean is then directed along a pattern along the area to be removed to partially separate the metal foil layer at the area to be removed from the corresponding carrier layer. The pattern may be a sinusoidal pattern. The induced stress causes the scrap metal foil layer to curl and effectively start to peel away or curl from the carrier layer that is still substantially flat. Alternative methods of stressing the scrap material include introducing laser energy to the selected area and rapidly heating and cooling the surface of said area.

Once the material to be removed is partially lifted off of the carrier, the material can be finally removed by, for example, manual operation, thus separating the undesirable material or scrap material from the desirable material or cut part. Under a controlled process, the two layers partially separate at least at the edges of the scrap material and/or part material near a corresponding cut line, for example. Without being bound by theory, the mechanism that creates this separation may be the thermal stressing of the material which causes the stresses area of the metal layer to bend while the carrier layer remains substantially flat resulting in partial separation of the metal layer from the carrier layer. Additionally, or alternatively, it may be the laser beam generating stress on a surface of the metal and thus causing the metal layer surface to bend thus creating a peeling action which separates the metal and carrier layer. This stress on the metal foil layer results from the laser energy being absorbed by the top surface such that the laser beam may partially melt the surface of the metal layer where the laser beam hits the metal layer. As molten metal then solidifies, the cooling provides a shrinking effect that can bend the material, causing the metal layer to bend or curl.

As noted previously above, the substrate is first laser processed to cut the metal foil on a carrier layer and in doing so, a metal vapor is generated when the metal is cut. While increased air pressure aids in the removal of the metal vapor from the cut site of the material, one or more air flows impinging on or near the cut site may be incorporated. In one embodiment an air knife may be incorporated into the laser processing system for providing the air flow(s). Further, a direction of the laser cutting with respect to the direction of the air flow can be in an opposing direction in order to increase the quality of the laser cut. The direction of the cut being opposite the direction of the air flow (opposite the direction in which the air flow impinges on the cut site) improves the quality of the cut. Without being bound by theory, it is believed that the opposing direction of the air flow aids in removal of the plume of debris generated at the cut site and prevents the debris from being blown into or towards the cut site.

Laser cutting metal foils is currently done with a fiber laser having a wavelength in the range of about 1020 nm to about 1090 nm. For example, the laser wavelength may be about 1070 nm or 1080 nm or otherwise any wavelength in the approximate range of 1020 nm to 1090 nm. The laser beam is collimated and is directed to a scanner for directing the laser beam to the substrate for cutting in a field of view on the substrate of approximately 250 mm×250 mm. The laser beam has a spot size (e.g., focal point) of about 28 microns. Air flow is introduced to the field of view and this air flow impinges on the target area (e.g., cut zone). For example, the air flow is generated using an air knife in the laser processing system. It is understood that the impinging air from the air knife may aid in ablation of the metal foil layer. Without a backing layer, the air flow required for laser processing would blow away or otherwise damage the cut metal foil parts as the metal foil layers are thin and can be moved and/or damaged by air flow directed to the cut site when the parts are cut.

A substrate construction for laser processing according to one or more embodiments described herein is illustrated at 10 in FIG. 1. The substrate construction 10 has a first layer 12 which may be a metal foil layer and a carrier layer 14 supporting the metal foil layer 12. The metal foil layer 12 comprises a metal that is vaporized by laser energy provided at a first wavelength. The carrier layer 14 may then be transparent to the laser energy provided at the first wavelength. In the embodiment illustrated, the carrier layer 14 is a polymer film.

An adhesive layer 16 may be provided between the carrier layer 14 and the metal foil layer 12 for securing the layers together for processing. The polymer film layer 14 remains intact when the metal foil layer 12 is cut by laser energy from a laser beam having a wavelength in the range of 1020 nm to 1090 nm in order to cut metal foil layer parts from the substrate construction.

Figure 2:
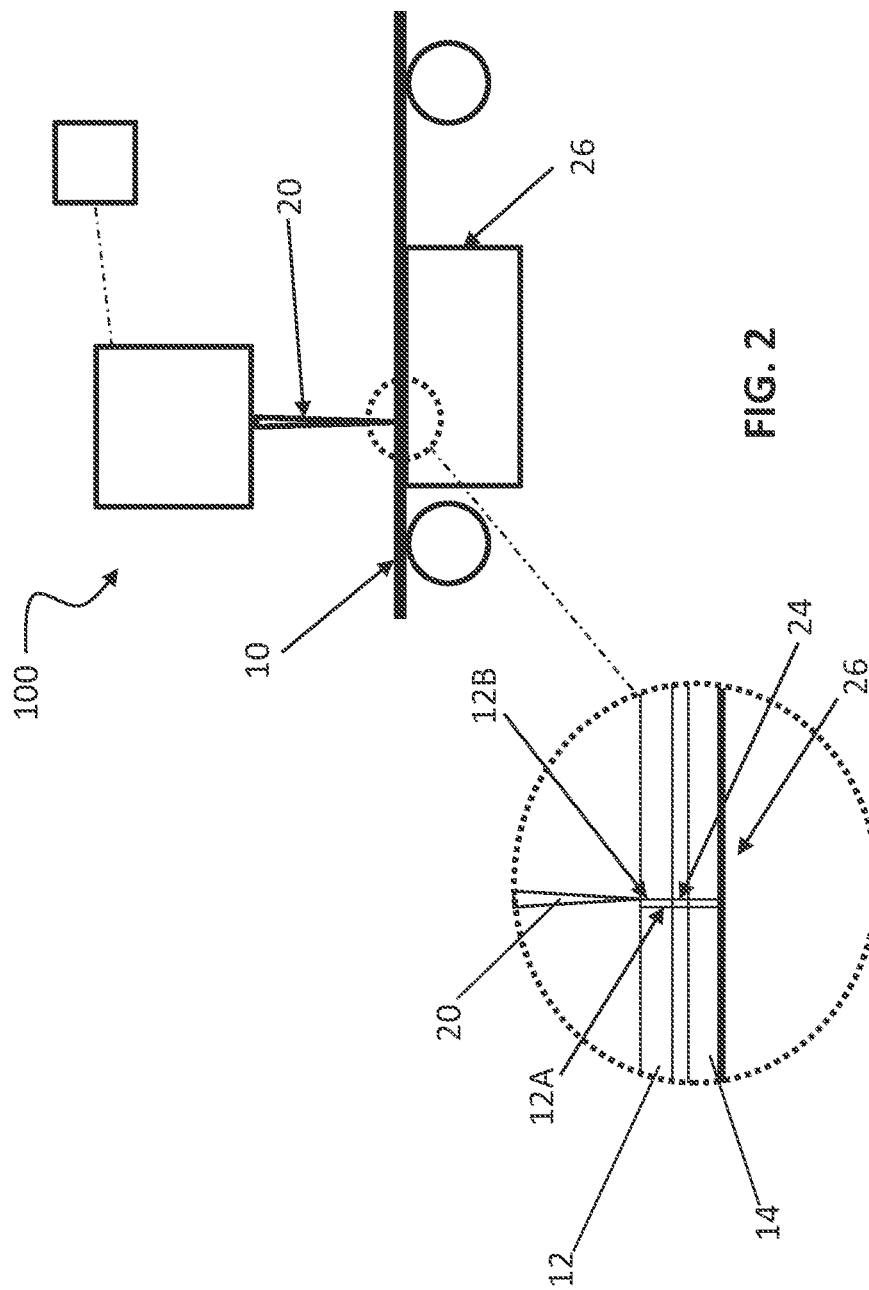
FIG. 2 illustrates a laser processing system for the substrate construction according to embodiments described herein.

As shown in FIG. 2, in one or more embodiments, a laser processing system 100 processes the multi-layer substrate 10 and vaporizes one or more locations on a top layer 12 of the substrate 10 with a laser beam 20 at a selected wavelength to a cut a part from the top layer 12. The carrier layer 14 is transparent to the laser energy 24 provided at the selected wavelength. The laser beam 20 is subsequently directed to one or more separation locations or removal areas 12A at or near one or more of the cut lines or vaporized locations 12B to cause the top layer 12 to curl at or near at least one or more of the separation locations or removal areas 12A. The substrate 10 can be retained in place during laser processing by a restraining mechanism 26 which may comprise generating a vacuum below the substrate 10.

Although the present disclosure has been described with reference to preferred embodiments, workers skilled in the art will recognize that changes may be made in form and detail without departing from the spirit and scope of the disclosure.

The invention claimed is:

1. A method of laser cutting a metal foil layer from a substrate construction, the method comprising:
   providing a carrier layer for the metal foil layer;
   generating a laser beam having a selected wavelength;
   directing the laser beam toward a surface of the metal foil layer to cut the metal foil layer, wherein the metal foil layer is vaporized by the laser beam at the selected wavelength and wherein the carrier layer is transparent to the laser beam at the selected wavelength such that the carrier layer remains substantially intact while the metal foil layer is laser cut into a plurality of parts; and
   directing the laser beam to one or more removal areas cut from the substrate and by setting the laser beam to cause the metal foil layer to curl proximate one or more cut lines and the metal foil layer to lift off of the carrier layer proximate the one or more cut lines for aiding in separation of the carrier layer from the metal foil layer.

2. The method of claim 1, wherein the carrier layer is a polymer film that is transparent to the selected wavelength.

3. The method of claim 1, wherein the carrier layer is laminated to the metal foil layer using an adhesive layer.

4. The method of claim 1, wherein aiding the separation of the carrier later from the metal foil layer comprises defocusing the laser beam and reducing a scanning speed of the laser beam while directing the laser beam to one or more removal areas.

5. The method of claim 1, further comprising directing the laser beam along a sinusoidal pattern between the one or more removal areas to curl or bend the metal foil layer.

6. The method of claim 1, wherein the substrate is retained in place during laser processing by a restraining mechanism comprising generating a vacuum below the substrate.

7. A substrate construction for laser cutting a metal foil, the substrate construction comprising:
   a metal foil layer; and
   a carrier layer supporting the metal foil layer,
   wherein the metal foil layer comprises a metal that is vaporized by laser energy provided at a selected wavelength in the range of 1020 nm to 1090 nm and wherein the carrier layer is transparent to the laser energy provided at the selected wavelength such that when laser processed at the selected wavelength the metal foil lifts off the carrier layer at one or more locations proximate the locations of the metal foil layer vaporized during laser processing, aiding the metal foil layer in separation from the carrier layer.

8. The substrate construction of claim 5, wherein the carrier layer is a polymer film.

9. The substrate construction of claim 5, and further comprising an adhesive layer between the carrier layer and the metal foil layer.

10. The substrate construction of claim 8, wherein the polymer film remains intact when the metal foil layer is cut by laser energy from a laser beam having the wavelength in the range of 1020 nm to 1090 nm.

11. A method of laser processing a multi-layer substrate, the method comprising:
   one or more locations on a top layer of the substrate with a laser beam at a selected wavelength to cut a part from the top layer;
   subsequently directing the laser beam to one or more separation locations at or near one or more of the vaporized locations to cause the top layer to curl at or near at least one or more of the separation locations wherein the top layer of the multi-layer substrate comprises a metal foil and a bottom layer of the multi-layer substrate is a carrier layer comprising a polymer.

12. The method of claim 11, wherein subsequently directing the laser beam to one or more separation locations further comprises defocusing the laser beam.

13. The method of claim 11, wherein the laser beam stresses the top layer at or near separation locations but does not cut the top layer at or near the separation locations such that the laser beam then causes the top layer to partially separate from a carrier layer.

14. The method of claim 11, wherein the multi-layer substrate further comprises an adhesive layer between the top layer and the carrier layer.

* * * * *